Patented Oct. 11, 1938

2,133,251

UNITED STATES PATENT OFFICE 2,133,251

CLARIFICATION AND PURIFICATION OF INDUSTRIAL ACID LIQUORS

Andrew T. McCord, Metuchen, N. J., assignor to National Lead Company, New York, N. Y., a corporation of New Jersey No Drawing. Application October 6, 1937, Serial No. 167,529

12 Claims. (Cl. 23—165)

This invention relates to the clarification and purification of industrial liquors containing strong inorganic acids. It has particular reference to the removal of suspended unfiltrable insoluble impurities from sulfuric acid solutions, such as sulfuric acid solutions of ilmenite. It has equal reference to the purification of waste acid solutions which are obtained from many industrial processes.

This application is a continuation-in-part of my previous application, Serial No. 70,109, filed on March 21, 1936.

An object of my invention is a simple and economical method for removing undesirable, suspended, solid, unfiltrable, impurities contained in industrial acid liquors. Another object of my invention is the removal from such liquors of residual colloidal organic coagulating agent and/or decomposition products thereof which may remain in unfiltrable colloidal suspension or in solution in the acid liquor. These and other objects of my invention will become apparent from the detailed description herein set forth.

Prior to my invention, processes have been developed for purifying industrial acid liquors by adding thereto an organic colloid which partially settled out the undesirable suspended solids. Many such processes involve the use of glue or similar materials as the organic colloid. I have found that prior art processes always involved certain major disadvantages. First, in many cases the glue or similar materials failed to remove as completely as desired the suspended solid materials. Furthermore, even if the suspended material was reduced to a satisfactory low value, part or all of the coagulating colloid itself or decomposition products thereof remained in colloidal suspension or in soluton in the acid liquor after filtration, decantation, etc. The presence of glue or similar material as well as the products resulting from the action of the acid on the glue, etc., is extremely objectionable in acid solutions; it causes frothing and foaming when these solutions are heated as in a vacuum evaporator; it is subject to further decomposition giving rise to obnoxious odors and carbonaceous decomposition products which act as reducing agents when the acid is heated; it interferes with the use of acid solutions in many chemical processes. The presence of glue, gelatins or other organic colloid and their decomposition products is particularly objectionable in phosphoric acid which is to be used for preparing monocalcium phosphate for manufacture of foodstuffs, e. g., baking powder, because it tends to impart an objectionable odor. By means of the present invention, these disadvantages are overcome.

When the acid liquors to be purified are of the strong acid type the problem of clarifying them by means of an organic colloid is particularly acute because such acids tend to act on the organic colloid forming decomposition products which are soluble in the acid liquors and which are not removed by decantation, filtration, etc. Thus, acids of the type of hydrochloric, sulfuric, and phosphoric, because they are highly ionized, tend to decompose, e. g., as by hydrolysis, organic colloids such as glue, proteins etc. The products of such decomposition or hydrolysis are usually amino acids which are soluble in the strong acid liquors. For instance, amino acetic acid, $NH_2CH_2COOH$, is a well-known decomposition product of glue or protein hydrolysis. It should be noted in this connection that by the expression "strong acid" I refer to such inorganic acid liquors as hydrochloric, sulfuric and phosphoric which are ionized to a high degree in aqueous solutions as distinct from weak acids, such as acetic, tartaric, oxalic, etc., which are ionized only to a slight degree. Thus, the concentration of acid molecules is not to be considered but rather the concentration of hydrogen ion. It should also be further noted that by the terms "residual organic matter" as used by me in the claims attached hereto, I mean to include both that part of the organic colloid which may remain in colloidal suspension in the acid liquor as well as the decomposition products of the said organic colloid which are in solution in the acid liquor.

Briefly stated, my invention consists in adding to the impure acid liquor an organic colloid to remove wholly or partially the undesired suspended matter, then adding to the said liquor, from which the settled suspended matter may or may not have been removed, another organic colloid capable of precipitating the first colloid as well as its decomposition products. Thus, my invention consists in the use of mutually coagulating organic colloids. The mutual coagulation may possibly be the result of a chemical reaction or may involve neutralization of opposite electrical charges carried by the colloidal materials.

I have found that the suspended matter contained in impure acid liquors may be wholly or partially removed by the addition of a colloid selected from the group consisting of glues, gelatins, albuminoids, proteins, either of animal or vegetable origin, and like materials. Fish or animal glue is particularly useful in the practice of this part of my invention. Alginates derived from varieties of marine algae are also useful. When such colloids are added to an acid liquor there is a coagulating effect followed by a settling of the coagulated colloid together with part or all of the suspended matter. However, there is always some part of the colloid itself or a decomposition product which remains in suspension or solution in the acid liquor and cannot be removed by filtration or similar methods. At the same time, part of the suspended material may also remain in suspension. If another colloid possessing the properties of precipitating the first colloid and its decomposition products, while itself being simultaneously coagulated and precipitated, be added, according to my improved methods, to the partially purified acid liquor, then that part of the first colloid which remains in the acid liquor in solution or in unfiltrable, colloidal suspension will be coagulated and precipitated by the second colloid and the whole will settle out of the solution carrying down any remaining suspended matter.

I have found that tannins are generally useful in coagulating the organic colloids first used in the practice of my invention. I have also found that tannins precipitate from solution in the acid liquors, the decomposition products of organic colloids. Whether this is due to a chemical reaction between the tannin and decomposition products of the organic colloid forming, for example, an acid-insoluble tannate of an amino acid or whether physical and chemical factors are involved, cannot be definitely affirmed but the fact is as stated. By the term "tannin" I mean to include all tanning materials derived from vegetable substances including various barks and nuts containing complex organic acids, together with the derivatives of such acids, such as their esters, glucosides, etc., which are capable of tanning leather. Bernthsen defines tannins as "naturally-occurring derivatives of polyhydroxy-benzoic acids which are used for converting skins into leather". (Organic Chemistry, 1933, pages 490-491, published by D. Van Nostrand Company.) Such materials may contain tannic acid, gallotannic acid, quinic acid, pyrogallic acid, etc. I may also use these acids in pure form to effect the coagulation of the organic colloid first added to the impure acid liquor. It will be understood that my invention is not limited to the use of naturally occurring tanning materials, but includes these as well as synthetically prepared tanning materials.

My invention is particularly useful in the art of manufacturing titanium pigments. As is known, commercial processes depend upon the thermal hydrolysis of a titanium sulfate solution. Such solutions are obtained by a reaction between a titaniferous ore and sulfuric acid, followed by dissolution of the resultant digestion cake in water or weak sulfuric acid. The resulting solution will contain considerable quantities of suspended insoluble material which largely consists of undissolved portions of the ore. This suspended material is so fine as to be colloidal in character and cannot be removed by filtration. It is essential, however, that the hydrolysis solution should be entirely free from suspended impurities. Consequently, industrial processes for the manufacture of titanium pigments comprising an hydrolysis of a titanium salt solution always involve a clarification treatment of the ilmenite solution. This clarification involves the addition of an organic colloid, for example, glue or alginates such as alginic acids and salts thereof as described in United States Patent No. 1,619,036 to Ravnestad. The acidity of the solution is sufficient to coagulate the colloid which settles out of solution carrying with it the major part of the suspended matter. Thus, I have found that even after a clarification treatment according to the best known methods of the prior art using glue as a clarifying agent there will remain in suspension about 0.04% by weight of suspended matter which cannot be removed by filtration. However, the solution being a strong acid (sulfuric acid) solution, some substantial part of the colloid is decomposed and the decomposition products are dissolved in the solution while, at the same time, a portion of glue apparently will remain in unfiltrable suspension in the ilmenite solution. By means of the addition of a mutually coagulating colloid, for example, tannic acid, according to my invention, not only the glue and its dissolved decomposition products, but also the finely-divided suspended matter can be removed by settling, decantation, filtration, etc. The resulting solution is excellently adapted for thermal hydrolysis.

Furthermore, processes for the manufacture of titanium pigments yield large quantities of dilute spent sulfuric acid more or less contaminated with finely-divided colloidal titanium dioxide, glue, etc. In most cases this acid is discarded involving a waste of raw material. I have found that if this spent acid be treated first with an organic colloid selected from the group including glues, gelatines, albuminoids, and proteins and then subsequently treated with an organic colloidal tannin, for example, oak tan or tannic acid, both the originally added colloid and its soluble decomposition products as well as any finely-divided colloidal titanium dioxide can be completely removed from the spent acid which may then be reconcentrated for subsequent use in the manufacture of titanium-pigments or other processes.

Not only is my invention applicable to the clarification of ilmenite solutions and waste sulfuric acid but it is likewise especially adapted for clarifying other acid liquor, for example, phosphoric acid.

In the wet process for the manufacture of food grade phosphoric acid, apatite ore is leached with dilute phosphoric acid to remove soluble iron and aluminum. The apatite is separated from the liquor by filtration, it being necessary to coagulate with gelatin to make this filtration step possible. Iron and aluminum are subsequently removed from the leach liquor which is returned to the acid system to minimize losses in phosphoric acid. This leach liquor carries with it an appreciable amount of gelatin and/or decomposition products thereof which gives the final concentrated phosphoric acid a highly objectionable "fertilizer" odor which is imparted to any phosphate compounds, e. g., monocalcium phosphate, made therefrom. This may be entirely avoided by the application of my invention.

Only small amounts of both colloids are required in the practice of my invention. For example, a quantity of organic colloid selected from the group consisting of glues, gelatins, albuminoids, and proteins equal to from ½ kg. to 2 kg. per cubic meter of acid liquor, is usually sufficient for the initial step. A quantity of the mutually coagulating colloid selected from the group consisting of tannins, organic acids and their derivatives contained therein, equal to from 0.1 to 5.0 parts to one part of the organic colloid added in the first step is usually sufficient to bring about a complete coagulation of both organic colloids and complete removal of all suspended material. Generally, the quantity of tannin to be added should be equivalent to the amount of organic colloid and decomposition products thereof remaining in suspension in the partially clarified acid liquor. It is desirable to use both organic colloids in the form of aqueous colloidal solutions.

Example No. 1

A concentrated aqueous colloidal solution of glue containing 1 kg. of glue on the dry basis was added to one cubic meter of a sulfuric acid solution of ilmenite. After filtration, the ilmenite solution contained 0.04% of solid impurities based on the weight of the solution and practically all the glue remained in the filtrate either as such or as decomposition products thereof. 2.5 kg. of tannic acid as a concentrated aqueous colloidal solution was then added. The tannic acid coagulated the glue and decomposition products to form flocs which readily settled out of suspension carrying with them the remaining suspended material. The solution was then decanted and filtered. After filtration the solution was substantially free of both suspended matter and organic matter.

Example No. 2

A concentrated aqueous colloidal solution of alginate containing alginic acid and derived from marine algae containing 1.5 kg. of organic colloid on the dry basis was added to one cubic meter of a spent sulfuric acid solution as a by-product from a manufacture of titanium pigments.

After coagulation and settling, the supernatant substantially clear liquor was decanted from the settled alginate and titanium dioxide. The decanted liquor contained a large part of the alginate as such and as decomposition products thereof, as well as a small percentage of colloidal titanium dioxide. 3.0 kg. of pyrogallic acid as a concentrated aqueous colloidal solution was then added. The pyrogallic acid, the alginate and its soluble decomposition products were mutually coagulated and formed flocs which settled out of suspension carrying with them the remaining suspended titanium dioxide. The solution was then filtered. The filtrate was substantially free from both organic matter and suspended titanium dioxide and was ready for reconcentration prior to reutilization in the manufacture of titanium pigments.

Example No. 3

2.5 kg. of gallotannic acid, as a concentrated aqueous solution, is added to one cubic meter of crude phosphoric acid leach liquor containing 1.5 kg. of gelatin and some finely-divided inorganic material. Flocs are formed as a result of the mutually coagulating action of the gelatin and/or gelatin decomposition products contained in the filtrate and the gallotannic acid. These flocs settle carrying down any remaining finely-divided impurities. After settling, the supernatant liquor is filtered. There is thus obtained a phosphoric acid substantially completely free from both organic matter and finely-divided impurities.

From the foregoing description of my invention, it will be seen that my novel process is readily adaptable for many industrial uses, particularly for the clarification of strong acid liquors.

I have used the term "mutually coagulating" to denote the property possessed by certain colloids to coagulate and to precipitate other colloids as well as decomposition products thereof, while being themselves also coagulated and precipitated regardless of whether a chemical reaction is involved or merely a physical effect such as a discharge of opposite electrical charges.

It will be understood that as used by me in this description of my invention and the claims appended hereto, the term "tannic acid" includes the group consisting of naturally occurring tanning materials, complex organic acids contained therein and derivatives of said acids which possess the property of tanning leather.

The foregoing detailed description has been given for clearness of understanding and no undue limitations should be deduced therefrom but the appended claims should be construed as broadly as possible in view of the prior art.

I claim:

1. Method of clarifying industrial acid liquors which comprises adding to an industrial liquor an aqueous solution of an organic colloid selected from the group consisting of glue, gelatins, albuminoids and proteins, said liquor containing a strong inorganic acid in sufficient quantity to coagulate the colloid which removes by settling finely-divided impurities suspended therein, then adding an aqueous solution of a tanning material selected from the group consisting of polyhydroxy-benzoic acids and derivatives thereof in sufficient quantity to remove substantially completely by precipitation residual organic matter and decomposed colloid together with any remaining finely-divided suspended impurities.

2. Method of clarifying industrial acid liquors which comprises adding to an industrial liquor an aqueous solution of an organic colloid selected from the group consisting of glues, gelatins, albuminoids and proteins, said liquor containing a strong inorganic acid in sufficient quantity to coagulate the colloid which removes by settling finely-divided impurities suspended therein, then adding an aqueous solution of a tanning material selected from the group consisting of polyhydroxy-benzoic acids and derivatives thereof in an amount substantally equivalent to that of residual organic matter and decomposed colloid derived from the previously added organic colloid remaining in the said liquor, to remove substantially completely by precipitation said residual organic matter and decomposed colloid together with any remaining finely-divided suspended impurities.

3. Method of clarifying a sulfuric acid ilmenite solution which comprises adding to said ilmenite solution an aqueous solution of an organic colloid selected from the group consisting of glues, gelatins, albuminoids, and proteins, said ilmenite solution containing sulfuric acid in sufficient quantity to coagulate the colloid which removes by settling finely-divided impurities suspended therein, then adding to the so-treated ilmenite solution an aqueous solution of a tanning material selected from the group consisting of polyhydroxy-benzoic acids and derivatives thereof in an amount substantially equivalent to that of residual organic mattter and decomposed colloid derived from the previously added organic colloid remaining in the said ilmenite solution to remove substantially completely by precipitation said residual organic matter and decomposed colloid together with any remaining finely-divided suspended impurities.

4. Method of clarifying a sulfuric acid ilmenite solution which comprises adding to said ilmenite solution an aqueous solution of glue, said ilmenite solution containing sulfuric acid in sufficient quantity to coagulate the glue which removes by settling finely-divided impurities suspended therein, then adding to the so-treated ilmenite solution an aqueous solution of tannic acid in an amount substantially equivalent to that of residual organic matter and decomposed glue derived from the glue remaining in the said ilmenite solution to remove substantially completely by precipitation said residual organic matter and decomposed glue together with any remaining finely-divided suspended impurities.

5. Method of clarifying spent sulphuric acid which comprises adding to such solution an aqueous solution of an organic colloid selected from the group consisting of glues, gelatins, albuminoids, and proteins, said spent acid containing sulfuric acid in sufficient quantity to coagulate the colloid which removes by settling finely-divided impurities suspended therein, then adding to the so-treated sulphuric acid solution an aqueous solution of a tanning material selected from the group consisting of polyhydroxy-benzoic acids and derivatives thereof in an amount substantially equivalent to that of residual organic matter and decomposed colloid derived from the previously added organic colloid remaining in said sulphuric acid to remove substantially completely by precipitation said residual organic matter and decomposed colloid together with any remaining finely-divided suspended impurities.

6. A method of clarifying crude phosphoric acid which comprises adding to a crude phosphoric acid solution an aqueous solution of an organic colloid selected from the group consisting of glues, gelatins, albuminoids, and proteins, said crude acid containing phosphoric acid in sufficient quantity to coagulate the colloid which removes by settling finely-divided impurities suspended therein, then adding to the so-treated phosphoric acid solution an aqueous solution of a tanning material selected from the group consisting of polyhydroxy-benzoic acids and derivatives thereof in an amount substantially equivalent to that of residual organic matter and decomposed colloid derived from the previously added organic colloid remaining in suspension in said phosphoric acid to remove substantially completely by precipitation said residual organic matter and decomposed colloid together with any remaining finely-divided suspended impurities.

7. Method of clarifying crude phosphoric acid which comprises adding to a crude phospohoric acid solution an aqueous solution of gelatin, said crude acid containing phosphoric acid in sufficient quantity to coagulate the gelatin which removes by settling finely-divided impurities suspended therein, then adding to the so-treated phosphoric acid solution an aqueous solution of pyro-tannic acid in an amount substantially equivalent to that of residual organic matter and decomposed gelatin derived from the gelatin remaining in suspension in said phosphoric acid to remove substantially completely by precipitation said residual organic matter and decomposed gelatin together with any remaining finely-divided suspended impurities.

8. In a method of clarifying an industrial liquor containing a strong inorganic acid in sufficient quantity to coagulate organic colloids, the step which consists in adding to an acid liquor which has been previously treated with an organic colloid coagulating agent and which contains residual organic matter and decomposed colloid derived from the added organic colloid, an aqueous solution of a tanning material selected from the group consisting of polyhydroxy-benzoic acids and derivatives thereof in an amount substantially equivalent to that of the organic matter and decomposed colloid contained therein.

9. In a method of clarifying an ilmenite solution containing sufficient sulfuric acid to coagulate organic colloids, the step which consists in adding to an ilmenite solution which has been previously treated with an organic colloid coagulating agent and which contains residual organic matter and decomposed colloid derived from the added organic colloid, an aqueous solution of a tanning material selected from the group consisting of polyhydroxy-benzoic acids and derivatives thereof in an amount substantially equivalent to that of the residual organic matter and decomposed colloid contained therein.

10. In a method of clarifying an ilmenite solution containing sufficient sulfuric acid to coagulate organic colloids, the step which consists in adding to an ilmenite solution which has been previously treated with glue and which contains residual and decomposed organic matter derived from the glue an aqueous solution of tannic acid in an amount substantially equivalent to that of the organic matter contained therein.

11. In a method of clarifying spent sulfuric acid containing sufficient sulfuric acid to coagulate organic colloids, the step which consists in adding to a spent sulfuric acid solution which has been previously treated with an organic colloid coagulating agent and which contains residual organic matter and decomposed colloid derived from the added organic colloid, an aqueous solution of a tanning material selected from the group consisting of polyhydroxy-benzoic acids and derivatives thereof in an amount substantially equivalent to that of the organic matter and decomposed colloid contained therein.

12. In a method of clarifying crude phosphoric acid containing sufficient phosphoric acid to coagulate organic colloids, the step which consists in adding to a crude phosphoric acid solution which has been previously treated with an organic colloid coagulating agent and which contains residual organic matter and decomposed colloid derived from the added organic colloid, an aqueous solution of a tanning material selected from the group consisting of polyhydroxy-benzoic acids and derivatives thereof in an amount substantially equivalent to that of the organic matter and decomposed colloid contained therein.

ANDREW T. McCORD.